(12) United States Patent
Dodworth

(10) Patent No.: US 8,066,925 B2
(45) Date of Patent: Nov. 29, 2011

(54) MOULDING PROCESS AND PRODUCT

(75) Inventor: Antony Dodworth, Crewe (GB)

(73) Assignee: Bentley Motors Limited (GB)

( * ) Notice: Subject to any disclaimer, the term of this patent is extended or adjusted under 35 U.S.C. 154(b) by 455 days.

(21) Appl. No.: 11/666,713

(22) PCT Filed: Oct. 31, 2005

(86) PCT No.: PCT/GB2005/004196
§ 371 (c)(1),
(2), (4) Date: Mar. 18, 2008

(87) PCT Pub. No.: WO2006/048617
PCT Pub. Date: May 11, 2006

(65) Prior Publication Data
US 2009/0061240 A1   Mar. 5, 2009

(30) Foreign Application Priority Data
Nov. 2, 2004   (GB) .................................. 0424257.4

(51) Int. Cl.
*B29C 45/14* (2006.01)
*B29C 35/02* (2006.01)
*B32B 15/04* (2006.01)

(52) U.S. Cl. ........ 264/242; 264/129; 264/132; 264/241; 264/257; 264/258; 264/259; 264/279; 264/299; 264/308; 264/309; 264/496; 428/457

(58) Field of Classification Search .................. 264/258, 264/496, 259, 279
See application file for complete search history.

(56) References Cited

U.S. PATENT DOCUMENTS

| 2,765,248 | A | | 10/1956 | Beech et al. |
| 3,343,430 | A | * | 9/1967 | Haas et al. ................... 76/107.1 |
| 4,313,996 | A | * | 2/1982 | Newman et al. .............. 428/215 |
| 4,402,779 | A | | 9/1983 | Levy |
| 4,692,373 | A | * | 9/1987 | Welz et al. .................... 442/382 |
| 5,073,589 | A | * | 12/1991 | Milovich et al. .............. 524/439 |

(Continued)

FOREIGN PATENT DOCUMENTS

FR   2 266 610   10/1975

(Continued)

OTHER PUBLICATIONS

Cheng, Xing, and Jay Guo, A combined-nanoimprint-and-photolithography patterning technique, Microelectronic Engineering, vol. 71 (2004) pp. 277-282.*

*Primary Examiner* — Jeffrey Wollschlager
(74) *Attorney, Agent, or Firm* — Salter & Michaelson

(57) ABSTRACT

In a moulding process for producing automobile parts, the female part (1) of a two part mould is sprayed with a metal such as stainless steel, tin, nickel-tin, copper or zinc. A thermal expansion compensation layer (3) is laid on the sprayed mould surface (1) and a layer of a resin impregnated fibrous material is applied thereto. The resultant assembly is cured and then removed from the female part of the mould or removed from the mould and then cured. The metal surface (2) of the composite part may be subject to further treatment such as polishing, coating and painting, or a combination of these. "Windows" may be produced by leaving areas of the mould part unsprayed with metal. In this way panels for lights, aerials or proximity sensors may be integrally formed.

22 Claims, 2 Drawing Sheets

U.S. PATENT DOCUMENTS

| | | | |
|---|---|---|---|
| 5,817,267 A * | 10/1998 | Covino et al. | 264/219 |
| 5,885,514 A * | 3/1999 | Tensor | 264/478 |
| 6,077,616 A | 6/2000 | Serafin et al. | |
| 6,455,148 B1 * | 9/2002 | Spears et al. | 428/319.1 |
| 2004/0105949 A1 * | 6/2004 | Krause | 428/57 |
| 2005/0074597 A1 * | 4/2005 | Grinberg et al. | 428/307.3 |

FOREIGN PATENT DOCUMENTS

| | | |
|---|---|---|
| GB | 1 479 194 | 10/1974 |
| GB | 2 054 448 | 2/1981 |

* cited by examiner

MOULDING PROCESS AND PRODUCT

TECHNICAL FIELD

The present invention relates to a moulding process and to a product of that process.

BACKGROUND OF THE INVENTION

The process is intended particularly, but not exclusively, for the manufacture of automobile parts. Although moulding of automobile parts from synthetic plastics material is already well known, such moulded parts can suffer from certain disadvantages. Moulded composite painted parts may be subject to the phenomenon of "print through" where the structure of the underlying moulded part becomes visible through the paintwork, if not immediately, eventually. Parts may also have poor impact resistance. This is of particular importance for example where the moulded part is a bumper. In general it may be more difficult if not impossible to obtain the high quality of surface finish obtainable with a metal part. It is an object of the invention to mitigate or overcome these disadvantages.

SUMMARY OF THE INVENTION

According to one aspect of the present invention there is provided a method of producing a moulded part including the steps of spraying the interior of a mould with a metal, laying a thermal expansion compensation layer on the sprayed mould surface, applying a layer of a resin impregnated fibrous material on the compensation layer and curing the resultant assembly.

According to another aspect of the present invention, there is provided a moulded part comprising an external metal layer, a thermal expansion compensation layer of a cured material adjacent to the metal layer and a layer of a cured resin impregnated fibrous material adjacent to the thermal expansion compensation layer material.

In a preferred embodiment of the invention, any metal may be used for the metal layer but preferred metals are stainless steel, aluminum, copper, zinc, tin or nickel-tin. The thermal expansion compensation layer may be a synthetic plastics material with a very low thermal conductivity.

The fibrous material may be carbon fibre and the resin impregnated may be epoxy or acrylic. The material may be applied as a layer or by spraying. As many layers of material as desired may be used.

The metal layer is advantageously sprayed onto the mould part to a thickness of between 0.2 mm and 1.5 mm. A preferred general thickness is 0.4 mm.

The mould part onto which the metal is sprayed is advantageously the female mould part of a two part mould. The mould may have more than two parts. The metal layer may be polished or painted, plated or coated or given other surface treatments after removal of the composite part from the mould. Further, combinations of differing surface treatments may be employed. The composite part may be cured in the mould or removed from the mould prior to curing. One or more areas of the mould part may be left unsprayed to leave "windows" in the composite part which are transparent or translucent. The thermal expansion compensation layer may be a transparent or translucent material. Those parts of the fibrous layer adjacent to these unsprayed areas may be made similarly transparent or translucent. In this way, panels for lights, aerials or proximity sensors or, other electrical or electronic components may be integrally formed in the moulded part. To assist in removing a moulded part from the mould one or each mould part may be provided with a multiplicity of apertures or holes to which positive air pressure may be supplied.

DESCRIPTION OF THE DRAWINGS

In order that the invention may be more clearly understood, embodiments thereof will now be described, by way of example, with reference to the accompanying drawings, in which.

DETAILED DESCRIPTION

Figure 1:
FIGS. 1 to 3 show successive stages in the production of a moulded part.
Figure 2:
Figure 3:
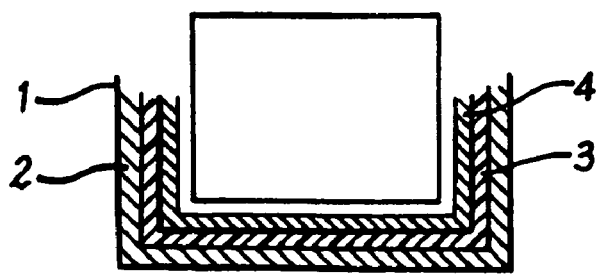

Referring to FIGS. 1 to 3, three stages in the production of a moulded part in accordance with the invention are respectively shown. In FIG. 1, the female part 1 of the mould is sprayed with a metal 2, advantageously to a thickness between 0.2 mm and 1.5 mm and preferably 0.4 mm.

Suitable metals are nickel-tin, stainless steel, tin, copper, zinc or aluminum, but other metals may equally well be used. The metal spraying process itself is conventional. A pair of electrodes of the metal to be sprayed is subject to a substantial electrical potential difference and vapourised metal between them is blown by a stream of high pressure gas at, for example 70p.s.i. into the mould to coat the mould surface with the sprayed metal. In some cases, a combination of procedures may be necessary or preferred. For example for a chrome finish, copper or brass is initially sprayed, subsequently coated with nickel and the nickel then plated with chrome. Alternatively, the part may be flash chromed directly where the sprayed metal is stainless steel.

Referring to FIG. 2, a layer 3 of a thermal expansion compensation layer material is applied to the sprayed layer of metal. Suitable thermal expansion compensation layer materials are non thermally conducting synthetic plastics material, such as polycarbonate.

Advantageously, the thickness of the thermal expansion compensation layer 3 is between 0.05 mm and 0.2 mm and preferably 0.1 mm.

Figure 4:
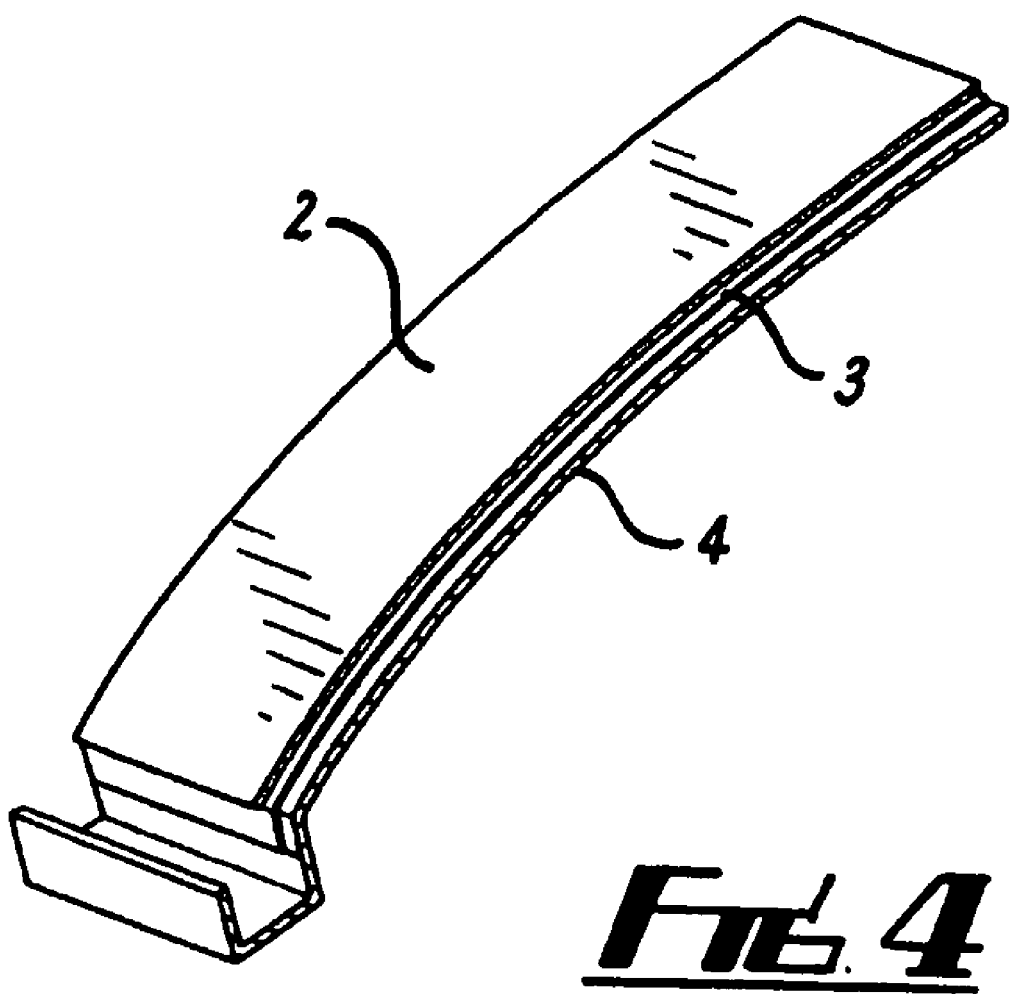
FIG. 4 diagrammatically shows, in perspective cross section, a moulded part produced in accordance with the method of FIGS. 1 to 3.

Referring to FIG. 3, a layer 4 of carbon fibre impregnated with resin for example is laid on the thermal expansion compensation layer 3. The use of carbon fibre with its very low coefficient of thermal expansion avoids or minimizes the usual problems when attaching plastic mouldings to metal substrates. The male and female parts of the mould are brought together to form the moulded part and the layers 3 and 4 are allowed to cure. Following curing, the composite moulded part may be removed from the mould. Alternatively, the moulded part may be cured after removal from the mould. A section through a finished part moulded in this way is shown in FIG. 4 where the same layers bear the same reference numerals as in FIGS. 1 to 3.

The sprayed metal layer becomes the external surface of the moulded part. This surface may be subjected to additional treatment such as polishing, painting, plating or coating. The above described moulding process may therefore be particularly suitable for the production of automotive parts. The metal layer may be employed as an EMC (electromagnetic compatibility) shield for electronic parts. Stylized metal finish assemblies may be used such as furniture or construction cladding. Lightweight components of very strong materials having very high quality surface finishes and high impact resistance may be produced. The impact resistance enables the corresponding part to deflect. The process may be applied to many other parts such as light/heat reflectors, bezels and radar dishes or any other part which is produced by a metal forming technique. Such parts may be provided with a PTFE or high temperature nylon, typically Zylon external surface. Zylon is a trade name for a nylon hybrid, which is tolerant to high temperature environmental conditions and has high strain mechanical performance. In each case the intermediate thermal expansion compensation layer 3 which has a very low coefficient of thermal expansion enables the carbon fibre/resin layer 4 to move with respect to the metal layer thus mitigating stresses caused due to different coefficients of thermal expansion between the materials of these layers. To assist with the removal of the composite product from the mould, a multiplicity of holes may be formed in the female mould part to which positive pressure may be applied to push the moulded product away from the mould surface and facilitate its removal from the mould. This mould structure is similar to that used in vacuum forming techniques although pressure as opposed to vacuum is applied to the holes.

The process enables parts to be made having integral panels with specific functions. This is particularly advantageous for automobile parts. Thus, for example, transparent or translucent panels of lights may be formed in bumpers by omitting the metal spray from the mould adjacent that panel, and forming the thermal expansion compensation layer and the carbon fibre layer of a transparent or translucent material, or having a section of those layers adjacent the panel of a transparent or translucent material. Similarly, panels behind which proximity parking sensors or aerials, in front and rear bumpers are housed, may be produced by omitting carbon so as not to interfere with the radiation sensing. Conversely the metal sprayed layer can be applied and grounded to form an EMC (electromagnetic compatibility) shield.

The above process enables automobile body parts to be accurately made with a weight up to 60% less than corresponding aluminum parts and with greater impact resistance. Very high quality surface finishes may be produced and different elements can be combined in a single moulding. Thus, for example, a single moulding may have polished and painted areas or indeed other areas subjected to other surface treatments. The process is not limited by normal extrusion, pressing or other traditional manufacturing techniques. Thus, for example, it is possible to provide sharp corners as opposed to radiused corners.

It will be appreciated that the above embodiments have been described by way of example only and that many variations are possible within the scope of the invention.

The invention claimed is:

1. A method of producing a moulded part including the steps of spraying the interior of a mould with a metal, laying a thermal expansion compensation layer on the sprayed mould surface, applying a layer of a resin impregnated fibrous material on the compensation layer and curing the resultant assembly, wherein the thermal expansion compensation layer is of a different material than the layer of resin impregnated fibrous material and has a thickness between 0.05 mm and 0.2 mm such that the thermal expansion compensation layer enables the resin impregnated fibrous material to move with respect to the metal layer, thus mitigating stresses caused under heating due to different coefficients of thermal expansion between the materials of these layers and wherein the thermal expansion compensation layer is a synthetic plastic material.

2. A method of producing a moulded part as claimed in claim 1, in which the interior of the mould is sprayed with one or more of the following metals, stainless steel, aluminium, copper, zinc, tin and nickel-tin.

3. A method of producing a moulded part as claimed in claim 1, in which the fibrous material is impregnated with an epoxy or acrylic.

4. A method of producing a moulded part as claimed in claim 1, in which the fibrous material is carbon fibre.

5. A method of producing a moulded part as claimed in claim 1, in which the metal layer is sprayed onto the mould part to a thickness of between 0.2 mm and 1.5 mm.

6. A method of producing a moulded part as claimed in claim 5, in which the metal layer is sprayed onto the mould part to a thickness of 0.4 mm.

7. A method of producing a moulded part as claimed in claim 1, in which the metal is sprayed onto the female mould part of a multipart mould.

8. A method of producing a moulded part as claimed in claim 1, in which the metal layer is subject to a surface treatment after removal from the mould.

9. A method of producing a moulded part as claimed in claim 8, in which the surface treatment includes or consists of polishing.

10. A method of producing a moulded part as claimed in claim 8, in which the surface treatment includes or consists of painting.

11. A method of producing a moulded part as claimed in claim 8, in which the surface treatment includes or consists of coating.

12. A method of producing a moulded part as claimed in claim 1, in which the resultant assembly is cured in the mould.

13. A method of producing a moulded part as claimed in claim 1, in which the resultant assembly is removed from the mould prior to curing.

14. A method of producing a moulded part as claimed in claim 1, in which one or more areas of the mould parts are left unsprayed to leave "windows" in the composite part.

15. A method of producing a moulded part as claimed in claim 14, in which the windows are transparent or translucent.

16. A method of producing a moulded part as claimed in claim 14, in which those parts of the fibrous layer adjacent the unsprayed areas are transparent or translucent.

17. A method of producing a moulded part as claimed in claim 1, in which the thermal expansion compensation layer is a transparent or translucent material.

18. A method of producing a moulded part as claimed in claim 1 including providing a different coefficient of thermal expansion between each of the metal layer, thermal expansion compensation layer, and the resin impregnated fibrous material layer.

19. A method of producing a moulded part as claimed in claim 1 in which the thickness of the thermal expansion compensation layer is about 0.1 mm.

20. A method of producing a moulded part as claimed in claim 1 wherein the step of laying a thermal expansion compensation layer includes laying a thermal expansion compensation layer constructed of a non-thermally conducting synthetic plastic material.

21. A method of producing a moulded part as claimed in claim 20 wherein said synthetic plastic material is polycarbonate.

22. A method of producing a moulded part as claimed in claim 1 wherein the step of laying a thermal expansion compensation layer includes laying a polycarbonate material, and wherein the step of applying a layer of a resin impregnated fibrous material includes applying a layer of carbon fiber.

* * * * *